US012729579B2

(12) United States Patent
Weston et al.

(10) Patent No.: US 12,729,579 B2
(45) Date of Patent: Sep. 8, 2026

(54) GARAGE MANAGEMENT SYSTEM AND METHOD

(71) Applicant: Ford Global Technologies, LLC, Dearborn, MI (US)

(72) Inventors: Keith Weston, Canton, MI (US); Brendan Diamond, Grosse Pointe, MI (US); Stuart C. Salter, White Lake, MI (US); Anthony Maraldo, Southgate, MI (US)

( * ) Notice: Subject to any disclaimer, the term of this patent is extended or adjusted under 35 U.S.C. 154(b) by 341 days.

(21) Appl. No.: 18/523,616

(22) Filed: Nov. 29, 2023

(65) Prior Publication Data

US 2025/0172030 A1 May 29, 2025

(51) Int. Cl.
*E05F 15/77* (2015.01)
*G07C 9/00* (2020.01)

(52) U.S. Cl.
CPC .......... *E05F 15/77* (2015.01); *G07C 9/00309* (2013.01); *G07C 9/00896* (2013.01); *E05Y 2900/106* (2013.01); *G07C 2009/00388* (2013.01); *G07C 2009/00928* (2013.01)

(58) Field of Classification Search
CPC ...... G07C 9/00309; G07C 2009/00928; G08B 1/146
See application file for complete search history.

(56) References Cited

U.S. PATENT DOCUMENTS 9,656,691 B2 5/2017 Heimberger et al.
9,892,578 B1 * 2/2018 Gage .................. G07C 9/00182
10,043,388 B1 * 8/2018 Kahn ..................... G06Q 50/40
10,185,921 B1 * 1/2019 Heller ....................... G07C 9/38
2009/0028674 A1 1/2009 Woo et al.
2017/0154482 A1 6/2017 Osborne
2021/0010316 A1 * 1/2021 Hopkins ................. H04W 4/44
2023/0391213 A1 * 12/2023 Alan ...................... G08G 1/146
2024/0194071 A1 * 6/2024 Zhang .................. G06V 10/762

FOREIGN PATENT DOCUMENTS

CN 105840041 A 8/2016

OTHER PUBLICATIONS

Sanner H. Mahmood, et al., Auto Opening Door and Car Identification, Journal of Computer and Communications, http://www.scirp.org/journal/jcc, Nov. 28, 2016, pp. 132-141.
Tailwind, Tailwind IQ3 Smart Automatic Garage Controller Pro, https://gotailwind.com/products/iq3-smart-garage-controller, 2023, pp. 1-8.

* cited by examiner

*Primary Examiner* — Nabil H Syed
(74) *Attorney, Agent, or Firm* — Joseph Zane; Eversheds Sutherland (US) LLP

(57) ABSTRACT

A facility management system including a transceiver and a processor is disclosed. The transceiver may be configured to receive a real-time vehicle location and facility inputs from a facility sensor unit. The processor may be configured to determine that a vehicle may be within a predefined distance from a facility door based on the real-time vehicle location. The processor may further determine a parking spot in a facility closest to the real-time vehicle location, responsive to determining that the vehicle may be within the predefined distance from the facility door. The processor may further determine an availability status associated with the parking spot based on the facility inputs, and control a facility door operation based on the availability status.

17 Claims, 6 Drawing Sheets

GARAGE MANAGEMENT SYSTEM AND METHOD

FIELD

The present disclosure relates to a garage door and parking space management system and method.

BACKGROUND

Many modern vehicles are equipped with garage door management systems that enable vehicle users to control garage door operation by using actuators present in the vehicles. For example, a vehicle operator may cause a garage door to open by activating a dedicated actuator disposed in the vehicle, when the vehicle may be in proximity to the garage door.

While conventional garage door management systems do provide benefits to the vehicle operators, there may be instances where the vehicle operators may desire enhanced features for controlling the garage door operation.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
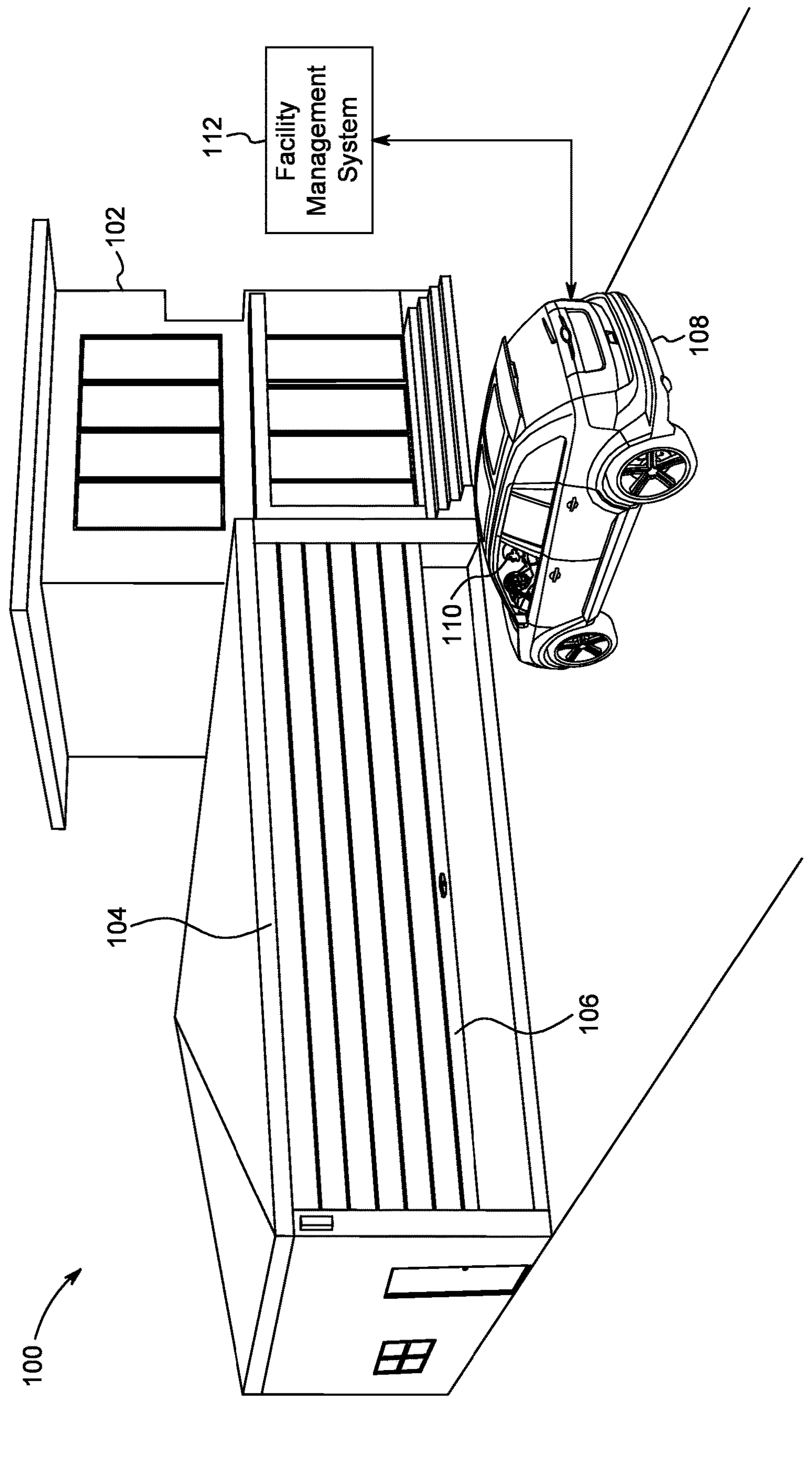
FIG. 1 depicts an example environment in which techniques and structures for providing the systems and methods disclosed herein may be implemented.

The present disclosure describes a facility management system and method that may automatically control a facility door operation. The facility may be, for example, a garage, and the facility management system ("system") may be part of a vehicle associated with the garage or a server. The system may be configured to obtain a real-time vehicle location when the vehicle may be located in proximity to the garage (e.g., approaching the garage). Based on the real-time vehicle location, the system may determine a parking spot in the garage that may be closest to the real-time vehicle location when the vehicle may be located within a predefined distance from a garage door. Responsive to determining the parking spot, the system may determine an availability or occupancy status of the parking spot, and automatically open the garage door when the availability status indicates that the parking spot may be unoccupied. In this manner, the system causes the garage door to open when the parking spot towards which the vehicle may be approaching is determined to be available for parking.

On the other hand, responsive to determining that the parking spot may not be available for parking, the system may identify an available parking spot in the garage for the vehicle. The system may then transmit the available parking spot location to the vehicle (and/or a user device associated with a vehicle user), and keep the garage door closed till the user moves the vehicle closer towards the available parking spot location or the vehicle autonomously moves towards the available parking spot location. Responsive to determining that the vehicle may have moved towards the available parking spot location, the system may cause the garage door to open.

In further aspects, the system may authenticate the user and/or the vehicle, and may open the garage door when the user and/or the vehicle may be authenticated. The system may further open the garage door based on weather condition information associated with a geographical area including the garage. As an example, the system may open the garage door when the vehicle may be located in proximity to the garage door and the weather condition information indicates that it may be raining.

In additional aspects, the system may open the garage door based on vehicle operational status, when the vehicle may be located in proximity to the garage door. As an example, the system may open the garage door when a vehicle gear may be in a drive or reverse mode for more a than predefined time duration (e.g., 3-5 seconds), when the vehicle may be located in proximity to the garage door.

The system may further open the garage door when the system determines that a large item (e.g., a lawn mower) may be placed in the vehicle. In further aspects, the system may open the garage door based on a command signal/request received from the user, the user device, the vehicle, and/or the like.

In additional aspects, the system may be configured to optimize parking space utilization in the garage. As an example, the system may learn over time the parking pattern, behavior and preferences associated with one or more users and/or vehicles associated with the garage, and may recommend an optimum parking spot for a vehicle based on a typical parking spot in the garage associated with the vehicle. The system may further have access to users' calendars, and may recommend an optimum parking spot for a vehicle based on one or more calendar events. For example, if the user is expected to take the vehicle out from the garage, determined based on the calendar event associated with the user, the system may recommend the user to park the vehicle at such a space in the garage that may enable the user to conveniently move the vehicle out from the garage, without requiring to shuffle other vehicles in the garage.

The present disclosure discloses a facility management system and method that automatically opens the garage door when the vehicle may be approaching the garage from a side that includes a vacant parking spot. The system further identifies vacant parking spots for the vehicle, and transmits recommended parking spots to the vehicle and/or the user device. The system additionally optimizes parking space utilization in the garage, so that parking the vehicle in the garage and moving the vehicle out from the garage may be convenient for the user. These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a building 102 including a facility 104. The building 102 may be, for example, a house, and the facility 104 may be, for example, a garage. Hereinafter, the facility 104 is referred to as garage 104 and the building 102 is referred to as house 102.

The garage 104 may include a garage door 106 that may be configured to move between a closed position and an open position to enable access to a garage interior portion. In an exemplary aspect, the garage interior portion may be accessed (e.g., to park one or more vehicles) when the garage door 106 may be in the open position. Further, the garage interior portion may not be accessed and/or the parked vehicles in the garage interior portion may not move out of the garage 104, when the garage door 106 may be in the closed position.

The environment 100 may further include a vehicle 108 and a user 110 (e.g., a vehicle driver and/or a house owner) who may be located in the vehicle 108. The vehicle 108 may take the form of any passenger or commercial vehicle such as, for example, a car, a work vehicle, a crossover vehicle, a truck, a van, a minivan, etc. Further, the vehicle 108 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

In the exemplary aspect depicted in FIG. 1, the vehicle 108 is located outside the garage 104 in proximity to the garage door 106. The environment 100 may further include a facility management system 112 (or system 112) that may be configured to control garage door operation and optimize parking space utilization in the garage 104.

The system 112 may be communicatively coupled with a plurality of systems/units/devices including, but not limited to, the vehicle 108, a user device (shown as user device 202 in FIG. 2) associated with the user 110, one or more servers (shown as server 204 in FIG. 2), a facility/garage sensor unit (shown as garage sensor unit 206 in FIG. 2), a facility/garage door actuator (shown as garage door actuator 208 in FIG. 2), and/or the like. The garage sensor unit may include, for example, garage interior and exterior cameras, Radio Detection and Ranging (radar) sensors and/or Light Detection and Ranging (lidar) sensors installed in the garage 104, and/or like. In some aspects, the system 112 may be part of the vehicle 108. In other aspects, the system 112 may be part of a server.

In some aspects, the system 112 may enable automatic opening of the garage door 106 based on one or more inputs received from at least one of the vehicle 108, the user device, the user 110 and the garage sensor unit. Specifically, the system 112 may automatically open the garage door 106 when the vehicle 108 may be located within a predefined distance (e.g., 1-8 feet) from the garage door 106 and one or more predefined conditions may be met (determined based on the inputs received by the system 112), as described below.

When the vehicle 108 may be approaching the garage 104 (with the garage door 106 being in the closed position), the system 112 may obtain a real-time vehicle location from the vehicle 108 (e.g., via a Global Positioning System (GPS) receiver associated with the vehicle 108), or may itself determine the real-time vehicle location based on the inputs obtained from the garage sensor unit or one or more sensors installed in proximity to the garage 104 (e.g., via vehicle-to-infrastructure (V2I) communication). Responsive to obtaining/determining the real-time vehicle location, the system 112 may determine whether the vehicle 108 may be disposed within the predefined distance from the garage door 106. In some aspects, the predefined distance may be pre-set by the user 110, and may be customizable/adjustable based on user preferences.

Figure 2:
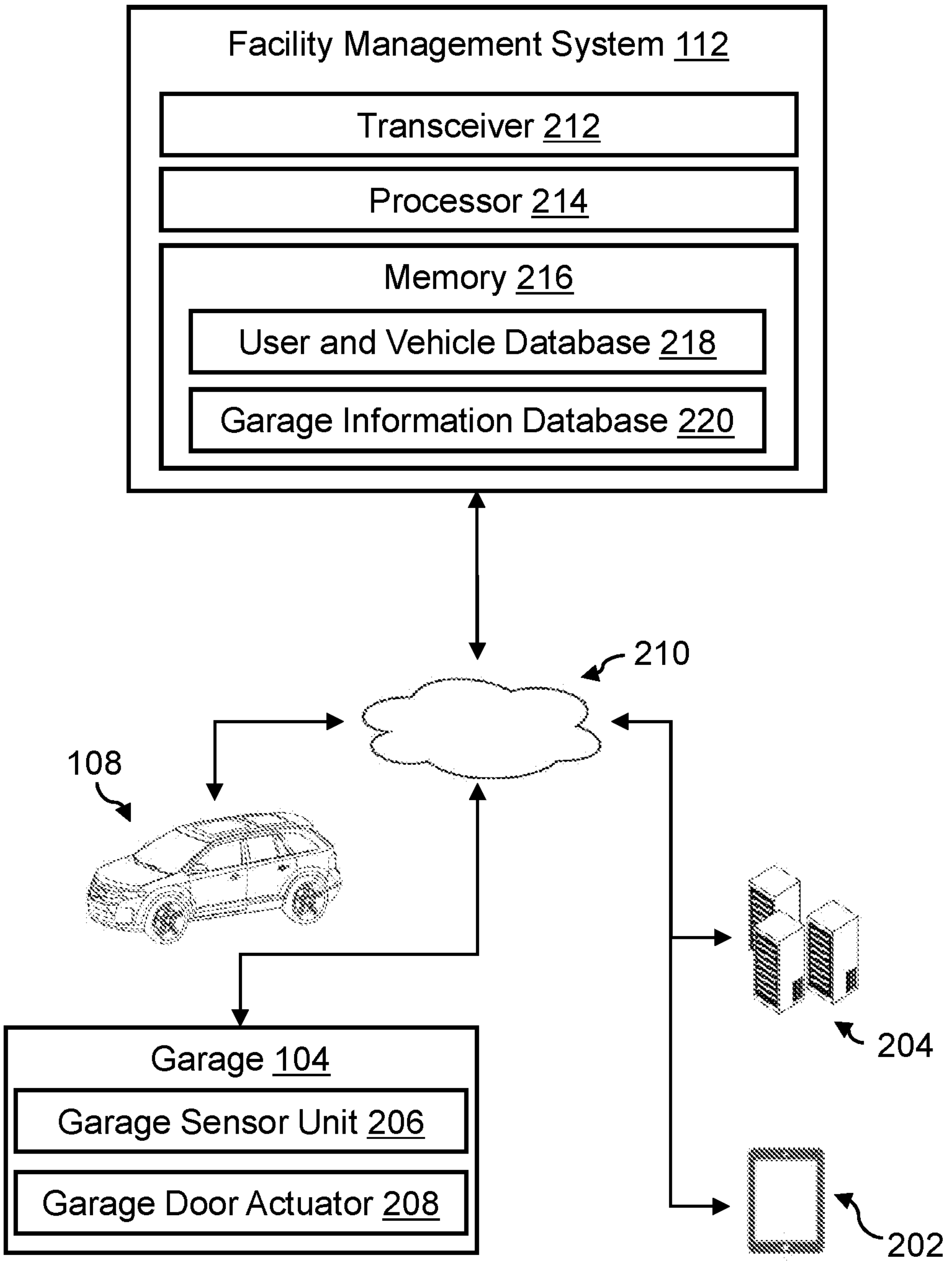
FIG. 2 depicts a block diagram of a facility management system in accordance with the present disclosure.

Responsive to determining that the vehicle 108 may be disposed within the predefined distance from the garage door 106, the system 112 may determine a parking spot/space (e.g., a first parking spot) in the garage 104 (specifically in the garage interior portion) that may be closest to the real-time vehicle location by correlating the real-time vehicle location with structural or architectural information associated with the garage 104 that may be pre-stored in a system memory (shown as memory 216 in FIG. 2). Stated another way, the system 112 may determine the parking spot in the garage 104 where the user 110 may attempt to park the vehicle 108 when the garage door 106 may be opened for the user 110/vehicle 108, based on the real-time vehicle location and the garage structural information.

Responsive to determining the parking spot, the system 112 may determine an availability status associated with the parking spot based on the inputs obtained from the garage sensor unit. Specifically, the system 112 may determine whether the parking spot may be occupied or unoccupied based on the images/videos/sensor data obtained from the garage cameras and/or sensors. In some aspects, the parking spot may be occupied when another vehicle may be parked at the parking spot, or a pet animal, another user (e.g., a kid) and/or an artifact (e.g., an unattended item/object) may be located at the parking spot.

The system 112 may automatically open the garage door 106 when the system 112 determines that the parking spot may be unoccupied. Stated another way, the system 112 may automatically open the garage door 106 for the user 110/vehicle 108 when the system 112 determines that the parking spot where the user 110 may park the vehicle 108 after entering through the garage door 106 is available for parking. In this manner, the system 112 ensures that the garage door 106 opens for the user 110/vehicle 108 when the parking spot is available, thereby enhancing user convenience and providing an indication to the user 110 that the user 110 is approaching the garage 104 from a "correct side" (through which parking the vehicle 108 may be possible).

On the other hand, the system 112 may not open the garage door 106 and may determine another parking spot (e.g., a second parking spot) in the garage interior portion that may unoccupied, when the system 112 determines that the first parking spot may be occupied. Responsive to determining the "available" second parking spot, the system 112 may transmit a notification to the vehicle 108 and/or the user 110 (via the user device or a vehicle Human-Machine Interface (HMI)) including information associated with the second parking spot. The information associated with the second parking spot may include, for example, a second parking spot location in the garage interior portion.

The user 110 may view/hear the notification transmitted by the system 112 and may get an indication that the first parking spot, where the user 110 may attempt to park the vehicle 108 after the garage door 106 opens, may not be available for parking. Responsive to viewing/hearing the notification, in some aspects, the user 110 may move the vehicle 108 towards the second parking spot. In other aspects, the vehicle 108 may autonomously move towards the second parking spot, responsive to receiving the notification from the system 112.

Responsive to the vehicle 108 moving in proximity to the second parking spot (as determined via the real-time vehicle location), the system 112 may automatically open the garage door 106. The user 110 may then park the vehicle 108 in the second parking spot. In this manner, the system 112 facilities the user 110 in parking the vehicle 108 at an available parking spot in the garage interior portion.

Although the description above describes an aspect where the system 112 opens the garage door 106 based on availability or occupancy status of parking spots in the garage interior portion, the present disclosure is not limited to such an aspect. The system 112 may control the garage door operation based on one or more additional criteria, as described below.

In some aspects, the system 112 may determine vehicle operational status based on the inputs obtained from the vehicle 108, and may open the garage door 106 based on the vehicle operational status. For example, the system 112 may determine whether a vehicle gear may in drive or reverse mode based on the vehicle operational status, and may not open the garage door 106 when the vehicle gear may not be in the drive or reverse mode. On the other hand, the system 112 may open the garage door 106 when the vehicle gear may be in the drive or reverse mode for more than a predefined time duration (e.g., 3 to 6 seconds, which may be customizable/adjustable by the user 110).

In further aspects, the system 112 may obtain weather condition information from the vehicle 108 or a server, and may open the garage door 106 based on the weather condition information. For example, the system 112 may open the garage door 106 for the user 110/vehicle 108 when the weather condition information indicates that it may be raining in a geographical area including the garage 104. In an exemplary aspect, the system 112 may open the garage door 106 irrespective of whether an available parking spot may be available in the garage interior portion or not, when the weather condition information indicates that it may be raining. In this case, the opening of the garage door 106 may enable the user 110 to take shelter in the garage interior portion, even when an available parking spot may not be available in the garage 104.

In further aspects, the system 112 may authenticate the user 110 and/or the vehicle 108 based on the inputs obtained from the garage sensor unit (e.g., garage exterior cameras), the vehicle 108, the user device, a key fob associated with the vehicle 108, and/or the like. The system 112 may open the garage door 106 when the user 110 and/or the vehicle 108 may be authenticated. The system 112 may additionally open the garage door 106 based on a command signal obtained from the user 110. For example, the system 112 may open the garage door 106 when the user 110 provides an audible command signal or a gesture-based command signal to the system 112 to open the garage door 106. The user 110 may also provide the command signal to the system 112 via the user device, the vehicle HMI and/or a dedicated actuator that may be disposed in the vehicle 108.

The system 112 may further control the garage door operation based on occupancy status associated with the vehicle 108, information associated with recent user activity in the garage 104/house 102, and/or the like. These and additional criteria implemented by the system 112 to control the garage door operation are described below in detail in conjunction with FIG. 2.

The vehicle 108 and the system 112 implement and/or perform operations, as described here in the present disclosure, in accordance with the owner manual and safety guidelines. In addition, any action taken by the user 110 based on the notifications provided by the vehicle 108 and/or the system 112 should comply with all the rules specific to the location and operation of the vehicle 108 (e.g., Federal, state, country, city, etc.). The notifications, as provided by the vehicle 108 and/or the system 112, should be treated as suggestions and only followed according to any rules specific to the location and operation of the vehicle 108.

FIG. 2 depicts a block diagram of the facility management system 112 (system 112) in accordance with the present disclosure. While describing FIG. 2, references will be made to FIGS. 3A, 3B, 4 and 5.

The system 112 may be communicatively coupled with the vehicle 108, a user device 202, one or more servers 204 (or server 204), and a garage sensor unit 206 and a garage door actuator 208 associated with the garage 104, via one or more networks 210 (or network 210). As described above in conjunction with FIG. 1, the garage sensor unit 206 may include garage interior and exterior cameras, radar sensors, lidar sensors, and/or the like installed in the garage 104. The garage door actuator 208 may enable mechanical opening and closing of the garage door 106 based on command signals received from the system 112.

The user device 202 may be associated with the user 110, and may include, for example, a mobile phone, a laptop, a computer, a tablet, a wearable device, or any other similar device with communication capabilities. The server 204 may be part of a cloud-based computing infrastructure and may be associated with and/or include a Telematics Service Delivery Network (SDN) that provides digital data services to the vehicle 108 and/or the system 112. In further aspects, the server 204 may be configured to provide weather condition information associated with a geographical area including the house 102/garage 104 to the system 112 at a predefined frequency or when the system 112 transmits a request to the server 204 to obtain the weather condition information. The server 204 may be further configured to store garage structural or architectural information (e.g., garage shape, dimensions, arrangement of garage door(s), windows, parking spots, etc.), and transmit the garage structural information to the system 112 at a predefined frequency or when the system 112 transmits a request to the server 204 to obtain the garage structural information.

The network 210 illustrates an example communication infrastructure in which the connected devices discussed in various embodiments of this disclosure may communicate. The network 210 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

As described above in conjunction with FIG. 1, the system 112 may be part of the vehicle 108 or a server. The system 112 may include a transceiver 212, a processor 214 and a memory 216. The transceiver 212 may be configured to transmit/receive signals/information/data to/from external systems and devices including the vehicle 108, the user device 202, the server 204, the garage sensor unit 206 and the garage door actuator 208 via the network 210.

The processor 214 may be disposed in communication with one or more memory devices disposed in communication with the respective computing systems (e.g., the memory 216 and/or one or more external databases not shown in FIG. 2). The processor 214 may utilize the memory 216 to store programs in code and/or to store data for performing aspects in accordance with the disclosure. The memory 216 may be a non-transitory computer-readable storage medium or memory storing a program code that enables the processor 214 to perform operations in accordance with the present disclosure. The memory 216 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 216 may include a plurality of databases including, but not limited to, a user and vehicle database 218 and a garage information database 220. The user and vehicle database 218 may store information associated with the user 110 (and friends and family of the user 110) and the vehicle 108 including, but not limited to, user images, identifiers and/or authentication codes associated with the user device 202, the vehicle 108, a key fob (not shown) associated with the vehicle 108, and/or the like. The garage information database 220 may store the structural information associated with the garage 104 that the system 112 may receive from the server 204, as described above.

In operation, the transceiver 212 may receive the real-time vehicle location from the vehicle 108 (e.g., via a GPS receiver associated with the vehicle 108 or via vehicle-to-infrastructure communication) and/or the garage sensor unit 206 when the vehicle 108 may be approaching the garage 104 (and the garage door 106 may be in the closed position). The transceiver 212 may further receive garage or facility inputs (e.g., images, videos, etc.) from the garage sensor unit 206 at a predefined frequency. The transceiver 212 may transmit the real-time vehicle location and the garage inputs obtained from the garage sensor unit 206 to the processor 214.

The processor 214 may obtain the real-time vehicle location and the garage inputs from the transceiver 212. Responsive to receiving the information described above, the processor 214 may determine that the vehicle 108 (specifically a vehicle front portion or a vehicle rear portion) may be located within the predefined distance from the garage door 106, based on the real-time vehicle location and the garage structural information (that may be stored in the garage information database 220).

Responsive to determining that the vehicle 108 may be located within the predefined distance from the garage door 106, the processor 214 may determine the first parking spot in the garage 104 that may be closest to the real-time vehicle location based on the garage structural information, as described above in conjunction with FIG. 1. The processor 214 may further determine an availability status associated with the first parking spot based on the garage inputs obtained from the garage sensor unit 206. Specifically, based on the images/videos/sensor data obtained from the garage sensor unit 206, the processor 214 may determine whether the first parking spot may be occupied or unoccupied. The processor 214 may control the garage door operation based on the availability status associated with the first parking spot, as described below.

Responsive to determining that the first parking spot may be unoccupied (or available for parking), the processor 214 may transmit a command signal to the garage door actuator 208 and cause the garage door 106 to open. Stated another way, the processor 214 may cause the garage door 106 to move to the open position when the availability status associated with the first parking spot indicates that the first parking spot may be unoccupied. The user 110 may park the vehicle 108 in the first parking spot or the vehicle 108 may autonomously park itself in the first parking spot when the garage door 106 may move to the open position.

On the other hand, responsive to determining that the first parking spot may be occupied (or not available for parking), the processor 214 may not cause the garage door 106 to move to the open position. For example, the processor 214 may not cause the garage door 106 to move to the open position when a pet, a kid, an artifact or another vehicle (e.g., a vehicle 302 shown in FIGS. 3A and 3B) may be located at the first parking spot. In this case, the processor 214 may determine an "available" or unoccupied second parking spot 304 in the garage 104 based on the garage inputs obtained from the garage sensor unit 206 and the garage structural information.

Figure 4:
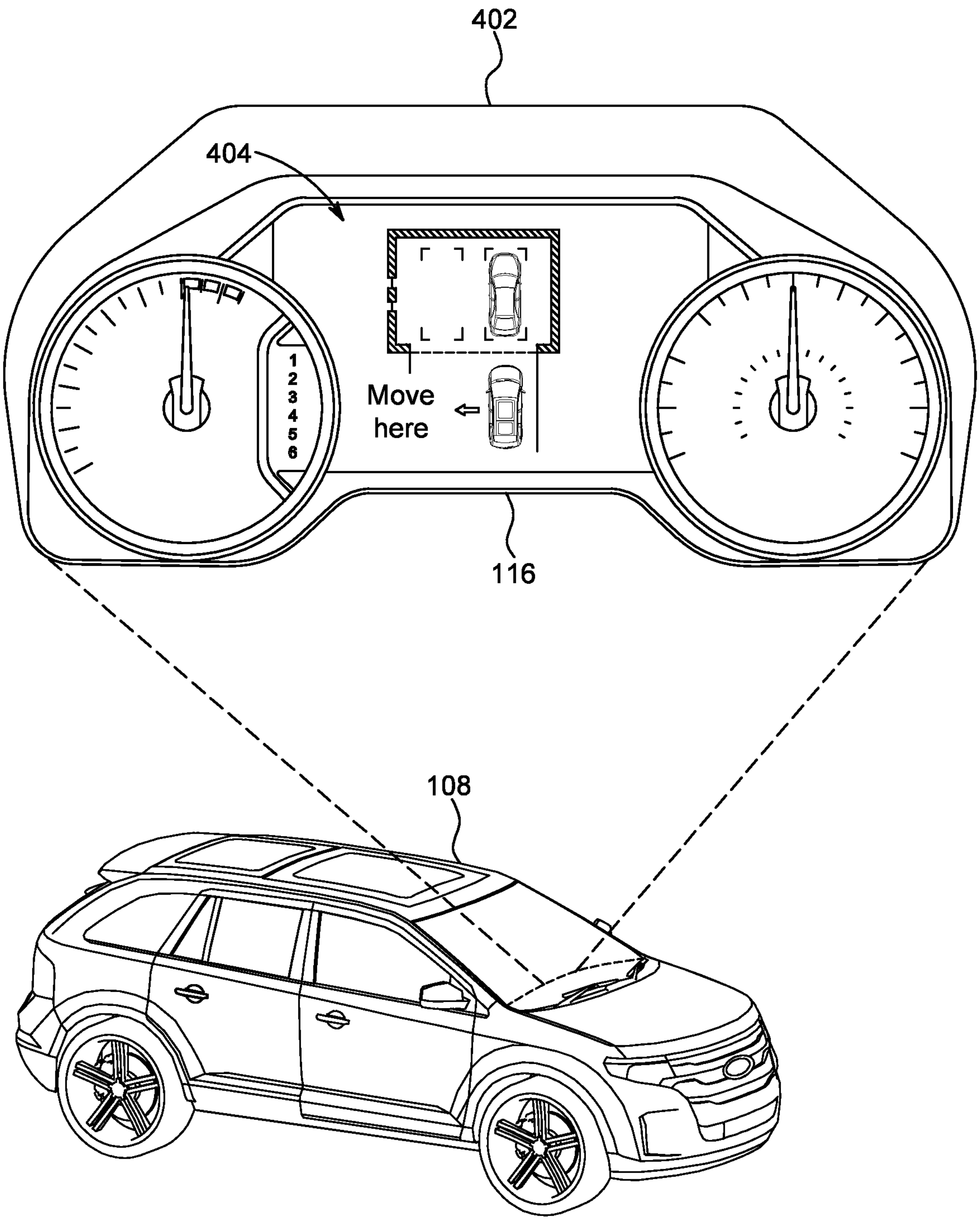
FIG. 4 depicts an example notification being displayed on a vehicle Human-Machine Interface (HMI) in accordance with the present disclosure.

Responsive to determining the second parking spot 304, the processor 214 may transmit, via the transceiver 212, a notification to the vehicle 108 and/or the user device 202. The notification may include, for example, information associated with the second parking spot 304 including a second parking spot location in the garage 104. The user device 202 or a vehicle Human-Machine Interface (HMI) may display (and/or audibly output) the notification when the processor 214 transmits the notification to the user device 202 or the vehicle 108, so that the user 110 may view (or hear) the notification. An example HMI 402 associated with the vehicle 108 displaying a notification 404 received from the processor 214 is shown in FIG. 4.

Figure 3A:
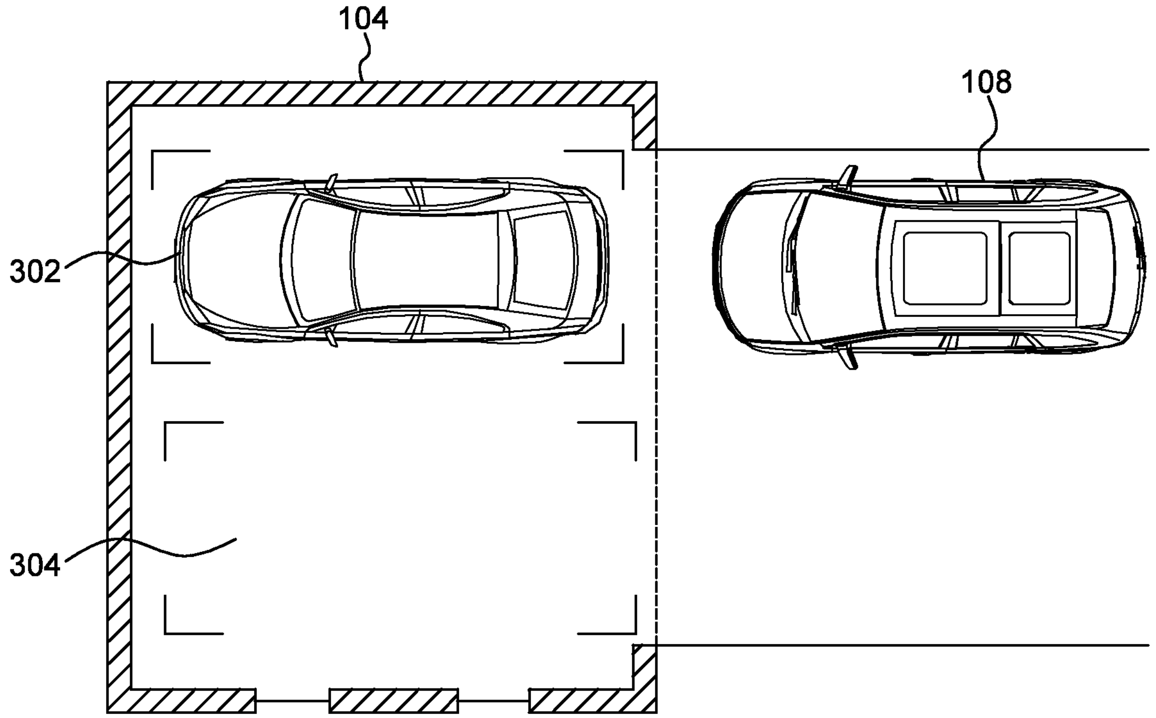
FIGS. 3A and 3B depict example top views of a facility in accordance with the present disclosure.
Figure 3B:
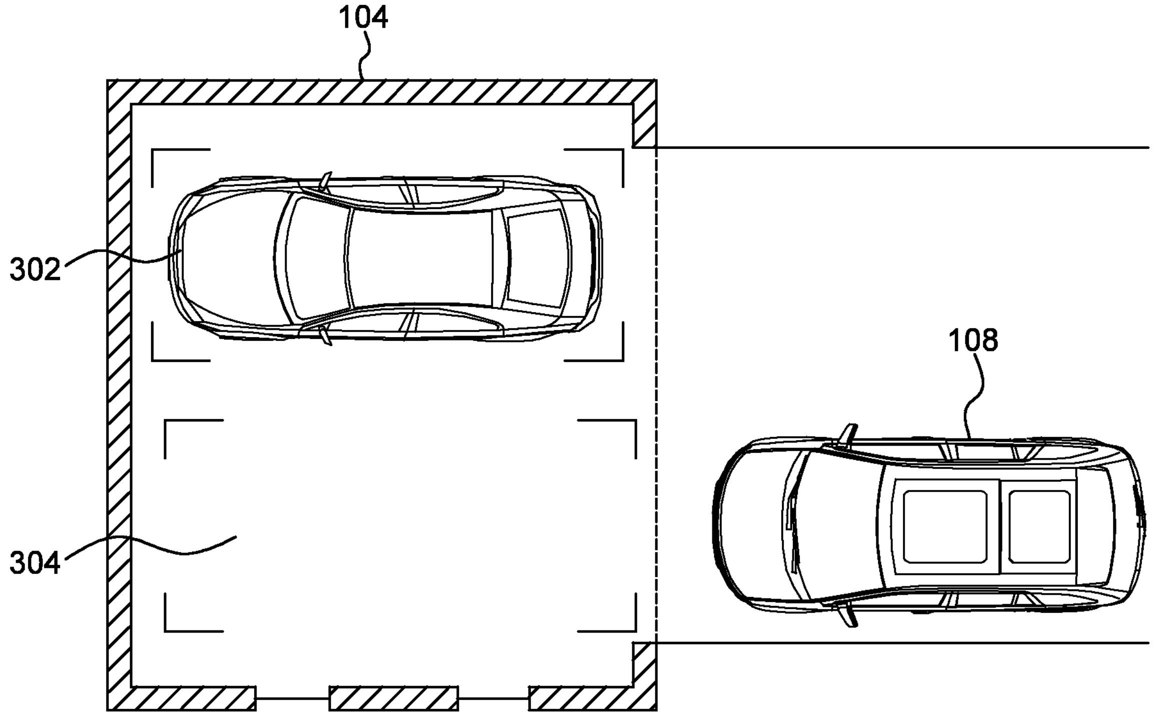

Responsive to viewing (or hearing) the notification 404, the user 110 may move the vehicle 108 towards the second parking spot location, as shown in FIG. 3B. If the vehicle 108 is an autonomous vehicle, the vehicle 108 may autonomously move towards the second parking spot location, responsive to receiving the notification 404 from the processor 214. The processor 214 may then determine that the vehicle 108 may have moved towards or in proximity to the second parking spot location based on the real-time vehicle location and/or the garage inputs obtained from the garage sensor unit 206. The processor 214 may transmit the command signal to the garage door actuator 208 and cause the garage door 106 to open, when the processor 214 determines that the vehicle 108 may have moved in proximity to the second parking spot location. In this manner, the system 112 facilitates the user 110 to identify a vacant parking spot and opens the garage door 106 when the vehicle 108 may be located in proximity to the vacant parking spot.

Although the description above describes an aspect where the processor 214 determines a single available parking spot (e.g., the second parking spot 304), in some aspects, the processor 214 may determine more than one available parking spot for the user 110/vehicle 108, and transmit information associated with the available parking spots to the user device 202 and/or the vehicle 108.

The system 112 may additionally control the garage door operation based on one or more additional criteria or conditions described below.

In some aspects, the transceiver 212 may be configured to receive the vehicle operational status from the vehicle 108 (e.g., when the vehicle 108 may be located within the predefined distance from the garage door 106), and transmit the vehicle operation status to the processor 214. In an exemplary aspect, the vehicle operational status may include a vehicle gear status.

The processor 214 may be configured to control the garage door operation based on the vehicle operational status. As an example, the processor 214 may cause the garage door 106 to open (e.g., via the garage door actuator 208) when the vehicle operational status indicates that the vehicle gear is in the drive or reverse mode. In additional aspects, the processor 214 may cause the garage door 106 to open when the vehicle gear may be in the drive or reverse mode and the vehicle 108 may be located in proximity to a vacant parking spot (e.g., the second parking spot 304). In yet another aspect, the processor 214 may cause the garage door 106 to open when the vehicle gear may be in the drive or reverse mode and the vehicle 108 may be located in proximity to a vacant parking spot for at least a predefined time duration (e.g., 3-5 seconds). The conditions (e.g., the predefined time duration) described herein may be customizable or adjustable by the user 110.

In further aspects, the transceiver 212 may be configured to receive the weather condition information associated with a geographical area including the house 102/garage 104 from the server 204 or the vehicle 108. The transceiver 212 may transmit the weather condition information to the processor 214, and the processor 214 may be configured to control the garage door operation based on the weather condition information. For example, the processor 214 may cause the garage door 106 to open (e.g., via the garage door actuator 208) when the weather condition information indicates that it may be raining or snowing. In this case, the processor 214 may cause the garage door 106 to open even when there may be no vacant parking spots in the garage 104. Further, in this case, the processor 214 may cause the garage door 106 to open when the user 110 and/or the vehicle 108 may be authenticated, as described below.

In some aspects, when the vehicle 108 may be located in proximity to the garage door 106, the processor 214 may obtain (via the transceiver 212) inputs from the key fob associated with the vehicle 108, the user device 202, the garage sensor unit 206, the vehicle 108, and/or the like, and use the obtained inputs to authenticate the user 110 and/or the vehicle 108. In some aspects, the inputs associated with the key fob, the user device 202 and the vehicle 108 may include identifiers or authentication codes associated with the respective devices/systems. The processor 214 may compare the obtained identifiers or authentication codes with the identifiers and/or authentication codes stored in the user and vehicle database 218 to authenticate the user 110/vehicle 108. In further aspects, the inputs obtained from the garage sensor unit 206 and/or the vehicle 108 may include user images (e.g., images of the user 110 captured by the garage exterior cameras and/or vehicle interior cameras). The processor 214 may compare the user images obtained from the garage sensor unit 206 and/or the vehicle 108 with the user images stored in the user and vehicle database 218 (e.g., using facial recognition technologies) to authenticate the user 110. Responsive to authenticating the user 110 and/or the vehicle 108, the processor 214 may open the garage door 106.

In further aspects, the transceiver 212 may be configured to receive user activity information associated with recent user activity from the vehicle 108 and/or the garage sensor unit 206 at a predefined frequency, e.g., when the user 110 may in the house 102 or the garage 104. The transceiver 212 may transmit the user activity information associated with recent user activity to the processor 214, and the processor 214 may control the garage door operation based on the user activity information. For example, if the user activity information associated with recent user activity indicates that the user 110 may have recently left the house 102 or the garage 104 for grocery shopping or picking up user's kid from the school, the processor 214 may cause the garage door 106 to automatically open when the user 110 arrives back at the house 102/garage 104 and is located in proximity to the garage door 106. In this case, the processor 214 may open the garage door 106 even when the user 110 may not desire (or may desire) to park the vehicle 108 in the garage 104. Further, in this case, the processor 214 may open the garage door 106 responsive to obtaining a user confirmation via the user device 202 or the vehicle HMI.

In further aspects, the transceiver 212 may be configured to receive a command signal from the user 110 (e.g., via an audible command or a gesture-based command, or via the user device 202 and/or the vehicle 108) when the user 110 desires the garage door 106 to open. Responsive to receiving the command signal, the transceiver 212 may transmit the command signal to the processor 214. The processor 214 may be configured to control the garage door operation based on the command signal. Specifically, the processor 214 may cause the garage door 106 to open (when/after the user 110 and/or the vehicle 108 may be authenticated, as described above) when the processor 214 obtains the command signal from the user 110 to open the garage door 106.

Figure 5:
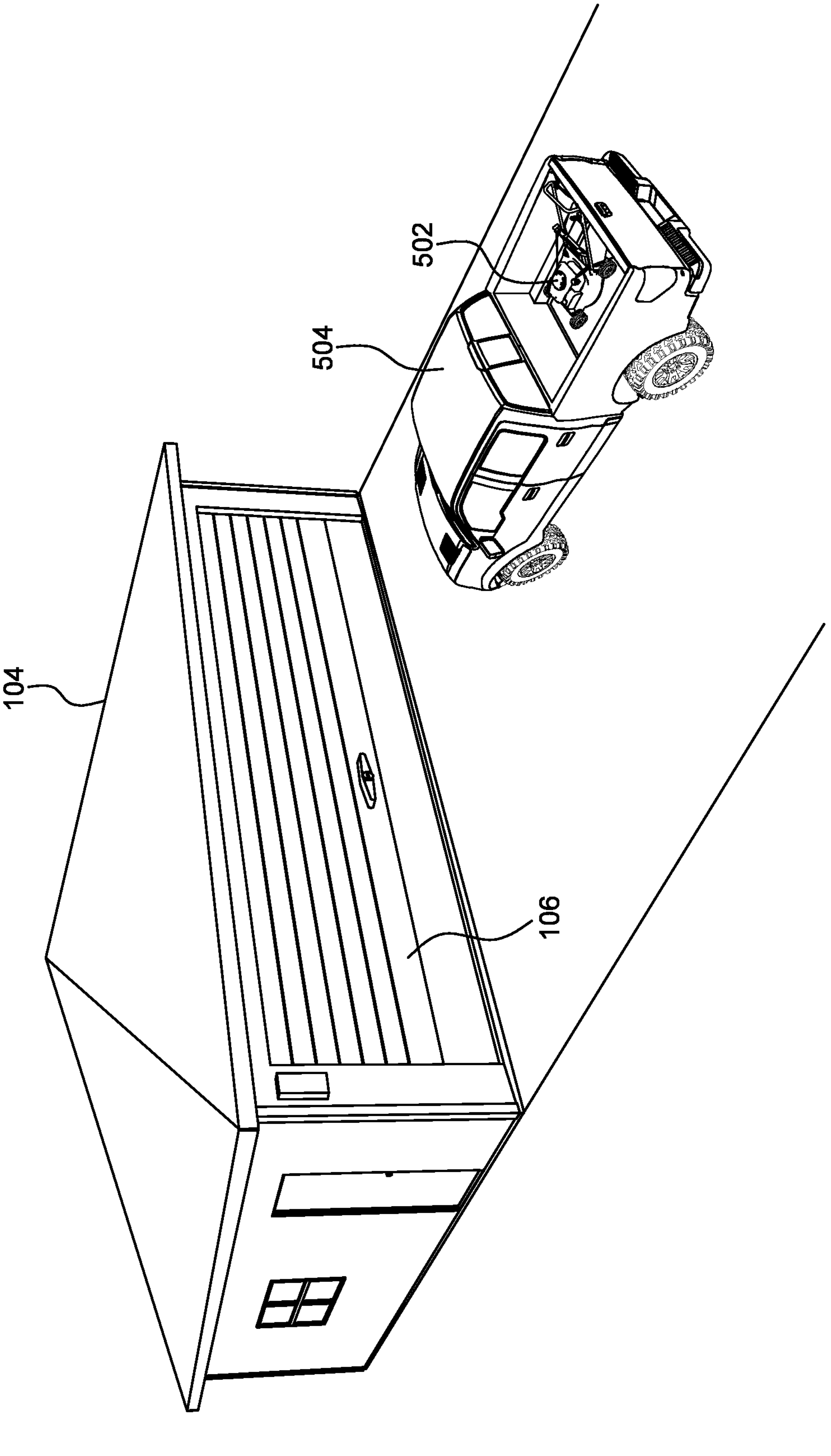
FIG. 5 depicts a vehicle carrying a large item in proximity to a facility in accordance with the present disclosure.

In further aspects, the transceiver 212 may be configured to receive vehicle occupant information from the vehicle 108 and/or the garage sensor unit 206 when the vehicle 108 may be located in proximity to the garage door 106. The vehicle occupant information may indicate a presence of one or more users or large items in the vehicle 108. For example, as shown in FIG. 5, a lawn mower 502 may be present in a vehicle 504 (which may be similar to the vehicle 108) that may be located in proximity to the garage door 106. In this case, the vehicle occupant information may indicate the presence of the lawn mower 502 in the vehicle 504.

The transceiver 212 may transmit the vehicle occupant information to the processor 214, and the processor 214 may control the garage door operation based on the vehicle occupant information. For example, the processor 214 may cause the garage door 106 to open when the vehicle occupant information indicates that a heavy item (e.g., the lawn mower 502) may present in the vehicle 504 (when/after the user 110 and/or the vehicle 504 may be authenticated, as described above). A person ordinarily skilled may appreciate that opening the garage door 106 automatically when the vehicle 108/vehicle 504 may be carrying a heavy item may facilitate the user 110 to conveniently offload the heavy item in the garage 104. In some aspects, in this case, the processor 214 may open the garage door 106 responsive to obtaining a user confirmation via the user device 202 or the vehicle HMI.

Although the description above describes an aspect where the system 112/processor 214 controls the garage door operation, in additional aspects, the processor 214 may assist in parking space optimization in the garage 104. In some aspects, the processor 214 may be an Artificial Intelligence (AI) based processor that may "learn" from parking habits, behavior, pattern and/or preferences of the user 110 (and other users associated with the house 102), and may recommend parking spots to the user 110 based on the parking preferences when the user 110 may be approaching the garage 104 to park the vehicle 108. The processor 214 may also learn the typical parking pattern and location associated with the vehicle 108, and recommend an optimum parking spot for the vehicle 108 when a user may be parking the vehicle 108 in the garage 104. As an example, the processor 214 may transmit a recommendation to the user device 202 and/or the HMI 402 indicating an optimum parking spot for the vehicle 108 when a user may be parking the vehicle 108 in the garage 104, based on a typical parking spot associated with the vehicle 108 in the garage 104. In some aspects, if the vehicle 108 is an autonomous vehicle, the processor 214 may cause the vehicle 108 to autonomously move to the optimum parking spot in the garage 104.

In additional aspects, the processor 214 may have access to user's calendar (e.g., via the user device 202) and the calendars associated with the family members of the user 110. The processor 214 may recommend an optimum parking spot for the vehicle 108 (and other vehicles associated with the house 102) based on the calendar events included in the calendars. For example, if the vehicle 108 is scheduled to leave the garage 104 next (identified based on the calendar events), the processor 214 may recommend a parking spot for the vehicle 108 such that moving the vehicle 108 out from the garage 104 may be convenient, without requiring to shuffle other vehicles in the garage 104. In this case, the processor 214 may additionally use the inputs obtained from the garage sensor unit 206 to autonomously move one or more vehicles in the garage interior portion.

In further aspects, the processor 214 may temporarily block/reserve (i.e., not allow any vehicle to park in) a parking spot in the garage 104 for a predefined time duration for the head of the household/family (e.g., the user 110) to return and get priority to park the vehicle 108 on the reserved parking spot.

In additional aspects, if the user 110 and/or the vehicle 108 may be carrying/storing large items or a large count of smaller items (e.g., grocery items), the processor 214 may enable the vehicle 108 to be temporarily parked at a spot/space in the garage 104 that may enable convenient offloading of the items (e.g., near a refrigerator placed in the garage 104). When the items may be offloaded, the processor 214 may autonomously move the vehicle 108 to a regular parking spot associated with the vehicle 108 in the garage 104.

Although the description above describes an aspect where the vehicle 108 may be communicatively coupled with the system 112/processor 214 via the network 210, in some aspects, if the vehicle 108 does not include communication unit/module/infrastructure to communicatively couple with the system 112/processor 214, the vehicle 108 may include a Bluetooth™ or BLE tag that may relay inputs from the vehicle 108 to the system 112/processor 214 (e.g., via other vehicles or infrastructure sensors).

Figure 6:
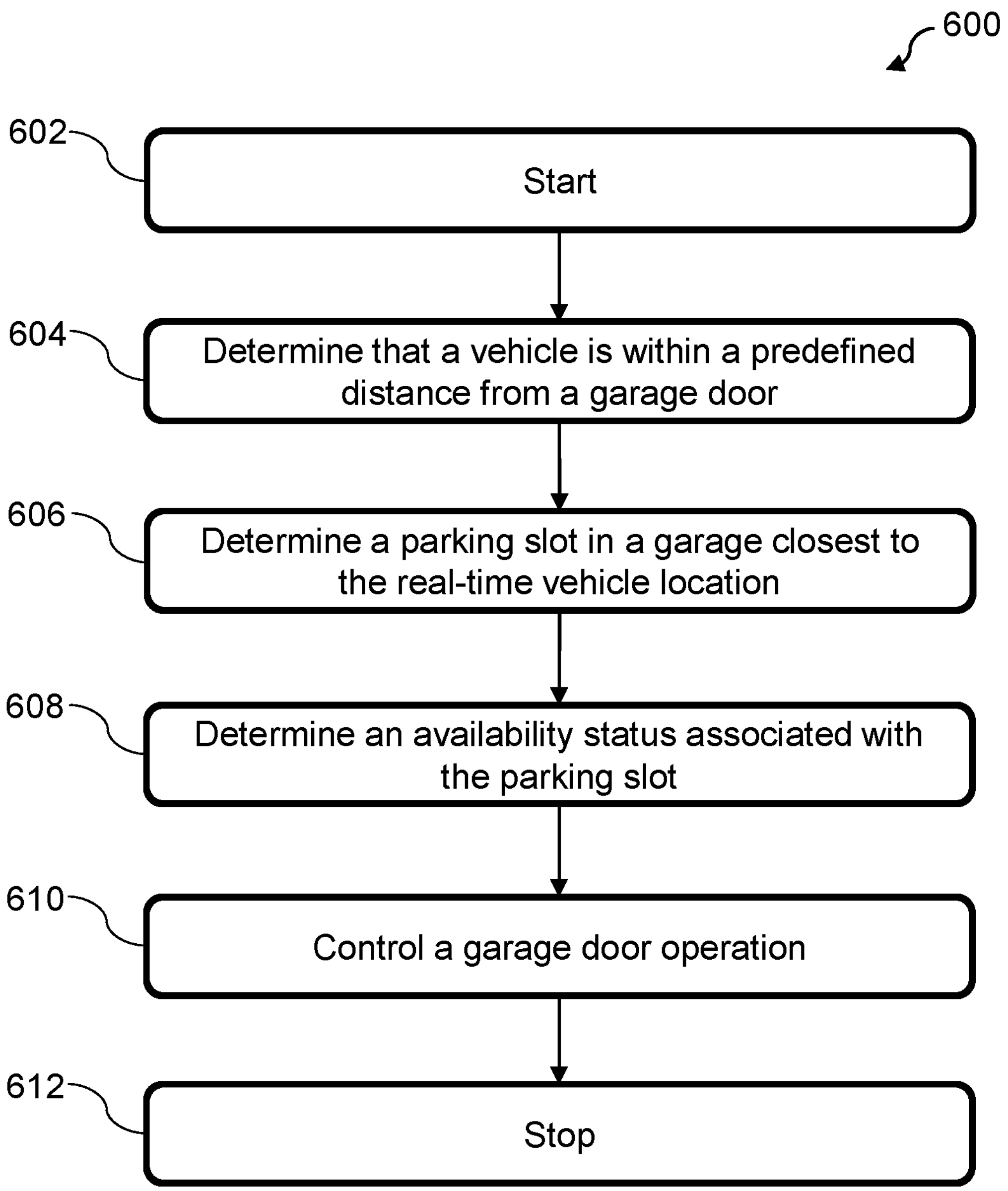
FIG. 6 depicts a flow diagram of an example facility management method in accordance with the present disclosure.

FIG. 6 depicts a flow diagram of an example facility management method 600 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include determining, by the processor 214, that the vehicle 108 may be within a predefined distance from the garage door 106 based on the real-time vehicle location. At step 606, the method 600 may include determining, by the processor 214, the parking spot in the garage 104 that may be closest to the real-time vehicle location. Responsive to determining that the vehicle 108 may be within the predefined distance from the garage door 106.

At step 608, the method 600 may include determining, by the processor 214, the availability status associated with the parking spot based on the inputs obtained from the garage sensor unit 206. At step 610, the method 600 may include controlling, by the processor 214, the garage door operation based on the availability status. For example, as described above, the processor 214 may cause the garage door 106 to open when the available status indicates that the parking lot may be unoccupied.

At step 612, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A facility management system comprising:

a transceiver configured to receive a real-time vehicle location and facility inputs from a facility sensor unit; and a processor communicatively coupled with the transceiver, wherein the processor is configured to:

determine that a vehicle is within a predefined distance from a facility door based on the real-time vehicle location;

determine a first parking spot in a facility that the vehicle would attempt to park in based on a current approach direction of the vehicle, wherein the first parking spot is determined by correlating the real-time vehicle location with structural information associated with the facility, and responsive to determining that the vehicle is within the predefined distance from the facility door;

determine an availability status associated with the first parking spot based on the facility inputs; and control a facility door operation based on the availability status.

2. The facility management system of claim 1, wherein the processor is further configured to open the facility door when the availability status indicates that the first parking spot is unoccupied.

3. The facility management system of claim 1, wherein the processor is further configured to:

determine an available second parking spot in the facility based on the facility inputs, when the availability status indicates that the first parking spot is occupied;

output a notification responsive to determining the available second parking spot, wherein the notification comprises information associated with the available second parking spot;

determine that the vehicle has moved in proximity to the available second parking spot, responsive to outputting the notification; and open the facility door responsive to determining that the vehicle has moved in proximity to the available second parking spot.

4. The facility management system of claim 3, wherein the processor outputs the notification to the vehicle or a user device associated with a vehicle user.

5. The facility management system of claim 1, wherein the transceiver receives the real-time vehicle location from at least one of the vehicle and the facility sensor unit.

6. The facility management system of claim 1, wherein the facility sensor unit comprises facility interior and exterior cameras.

7. The facility management system of claim 1, wherein the facility is a garage.

8. The facility management system of claim 1 further comprising a memory configured to store structural information associated with the facility, and wherein the processor determines that the vehicle is within the predefined distance from the facility door and the first parking spot in the facility closest to the real-time vehicle location based on the structural information.

9. The facility management system of claim 1, wherein the transceiver is further configured to receive a vehicle operational status from the vehicle, and wherein the processor is configured to control the facility door operation based on the vehicle operational status.

10. The facility management system of claim 9, wherein the vehicle operational status comprises a vehicle gear status, and the processor is further configured to open the facility door when the vehicle gear status indicates that a vehicle gear is in a drive mode or a reverse mode for more than a predefined time duration when the vehicle is within the predefined distance from the facility door.

11. The facility management system of claim 1, wherein the processor is further configured to:

authenticate at least one of a vehicle user and the vehicle; and control the facility door operation based on the authentication.

12. The facility management system of claim 11, wherein the processor authenticates the at least one of the vehicle user and the vehicle based on inputs obtained from at least one of a key fob, a user device and the facility sensor unit.

13. The facility management system of claim 1, wherein the transceiver is further configured to receive a command signal from at least one of a user, a user device and the vehicle, and wherein the processor is configured to control the facility door operation based on the command signal.

14. A facility management method comprising:

determining, by a processor, that a vehicle is within a predefined distance from a facility door based on a real-time vehicle location;

determining, by the processor, a first parking spot in a facility that the vehicle would attempt to park in based on a current approach direction of the vehicle, wherein the first parking spot is determined by correlating the real-time vehicle location with structural information associated with the facility, and responsive to determining that the vehicle is within the predefined distance from the facility door;

determining, by the processor, an availability status associated with the first parking spot based on facility inputs obtained from a facility sensor unit; and controlling, by the processor, a facility door operation based on the availability status.

15. The facility management method of claim 14 further comprising opening the facility door when the availability status indicates that the first parking spot is unoccupied.

16. The facility management method of claim 14 further comprising:

determining an available second parking spot in the facility based on facility inputs, when the availability status indicates that the first parking spot is occupied;

outputting a notification responsive to determining the available second parking spot, wherein the notification comprises information associated with the available second parking spot;

determining that the vehicle has moved in proximity to the available second parking spot, responsive to outputting the notification; and opening the facility door responsive to determining that the vehicle has moved in proximity to the available second parking spot.

17. A non-transitory computer-readable storage medium having instructions stored thereupon which, when executed by a processor, cause the processor to:

determine that a vehicle is within a predefined distance from a facility door based on a real-time vehicle location;

determine a first parking spot in a facility that the vehicle would attempt to park in based on a current approach direction of the vehicle, wherein the first parking spot is determined by correlating the real-time vehicle location with structural information associated with the facility, and responsive to determining that the vehicle is within the predefined distance from the facility door;

determine an availability status associated with the first parking spot based on facility inputs obtained from a facility sensor unit; and control a facility door operation based on the availability status.

* * * * *